(12) United States Patent
Hoots et al.

(10) Patent No.: US 10,958,973 B2
(45) Date of Patent: Mar. 23, 2021

(54) DERIVING AND IDENTIFYING VIEW PREFERENCES OF A USER CONSUMING STREAMING CONTENT

(71) Applicant: INTERNATIONAL BUSINESS MACHINES CORPORATION, Armonk, NY (US)

(72) Inventors: Harry Hoots, Raleigh, NC (US); Hernan A. Cunico, Holly Springs, NC (US); Martin G. Keen, Cary, NC (US); Uma Maheshwar Reddy Chamakura, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/430,863

(22) Filed: Jun. 4, 2019

(65) Prior Publication Data
US 2020/0389701 A1 Dec. 10, 2020

(51) Int. Cl.
*H04H 60/32* (2008.01)
*H04N 21/442* (2011.01)
*H04N 21/45* (2011.01)
*H04N 21/422* (2011.01)
*H04N 21/475* (2011.01)

(52) U.S. Cl.
CPC . *H04N 21/44222* (2013.01); *H04N 21/42203* (2013.01); *H04N 21/42222* (2013.01); *H04N 21/44204* (2013.01); *H04N 21/4532* (2013.01); *H04N 21/4755* (2013.01)

(58) Field of Classification Search
None
See application file for complete search history.

(56) References Cited

U.S. PATENT DOCUMENTS

| 6,931,656 | B1 * | 8/2005 | Eshelman | H04N 5/44513 345/473 |
| 8,046,798 | B1 * | 10/2011 | Schlack | H04N 21/25891 725/46 |
| 9,305,151 | B1 * | 4/2016 | Dotan | G06F 21/31 |

(Continued)

FOREIGN PATENT DOCUMENTS

EP 1230798 A1 8/2002

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — William J Kim
(74) *Attorney, Agent, or Firm* — Kenneth Han

(57) ABSTRACT

A method, computer system, and computer program product for viewing preferences identification are provided. The embodiment may include receiving, by a processor, a plurality of data related to a user profile. The embodiment may also include collecting user interaction information from a streaming content service. The embodiment may further include analyzing the user habits and patterns based on the collected user interaction information. The embodiment may also include comparing the habits and patterns with the received user profile. The embodiment may further include prompting a user to confirm an identity associated with the user profile when there is a match between the user profile and the habits and patterns.

18 Claims, 11 Drawing Sheets

(56) References Cited

U.S. PATENT DOCUMENTS

| | | | |
|---|---|---|---|
| 9,554,182 B2 | 1/2017 | Segel | |
| 9,860,596 B1* | 1/2018 | Venkataraman | ... H04N 21/4882 |
| 10,182,258 B1 | 1/2019 | Schlack | |
| 10,445,304 B1* | 10/2019 | Thompson | ....... H04N 21/44204 |
| 2002/0104087 A1* | 8/2002 | Schaffer | ................ H04N 7/163 |
| | | | 725/46 |
| 2006/0156326 A1* | 7/2006 | Goronzy | .......... H04N 21/25891 |
| | | | 725/13 |
| 2007/0028266 A1 | 2/2007 | Trajkovic | |
| 2009/0133051 A1* | 5/2009 | Hildreth | ............. H04N 21/4223 |
| | | | 725/28 |
| 2009/0327816 A1* | 12/2009 | Takata | .................... G06F 9/453 |
| | | | 714/46 |
| 2013/0035086 A1 | 2/2013 | Chardon | |
| 2014/0184922 A1* | 7/2014 | Schafer | ............ H04N 21/44222 |
| | | | 348/734 |
| 2014/0344855 A1* | 11/2014 | Morrow | ............. H04N 21/4622 |
| | | | 725/34 |
| 2015/0281783 A1* | 10/2015 | Laksono | ............ H04N 21/4415 |
| | | | 725/10 |
| 2015/0373408 A1* | 12/2015 | Yurasits | ........... H04N 21/44218 |
| | | | 725/12 |
| 2016/0309224 A1 | 10/2016 | Legallais | |
| 2018/0011900 A1* | 1/2018 | Husain | ................ G06F 16/9535 |

* cited by examiner

DERIVING AND IDENTIFYING VIEW PREFERENCES OF A USER CONSUMING STREAMING CONTENT

BACKGROUND

The present invention relates, generally, to the field of computing, and more particularly to streaming technologies.

Streaming is a technology for transferring data to computers and mobile devices over the internet. Streaming media is video or audio content sent in compressed form over the internet and played immediately, rather than being saved to a hard drive. A user does not need to wait to download a file to play streaming media as the media is sent in a continuous stream of data so that it can play as it arrives. There is only an initial, negligible waiting period as the file is buffered. Streaming media is much faster than viewing audio or visual content in the conventional matter, where all the media needs to be downloaded by a viewer completely before viewing it. Typically, users can pause, rewind or fast-forward the file. The other major difference between streaming and downloads is what happens to the data after a user uses it. For downloads, the data is stored on the user device until the user deletes it. For streams, the data is automatically deleted after a user uses it.

SUMMARY

According to one embodiment, a method, computer system, and computer program product for viewing preferences identification are provided. The embodiment may include receiving, by a processor, a plurality of data related to a user profile. The embodiment may also include collecting user interaction information from a streaming content service. The embodiment may further include analyzing the user habits and patterns based on the collected user interaction information. The embodiment may also include comparing the habits and patterns with the received user profile. The embodiment may further include prompting a user to confirm an identity associated with the user profile when there is a match between the user profile and the habits and patterns.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
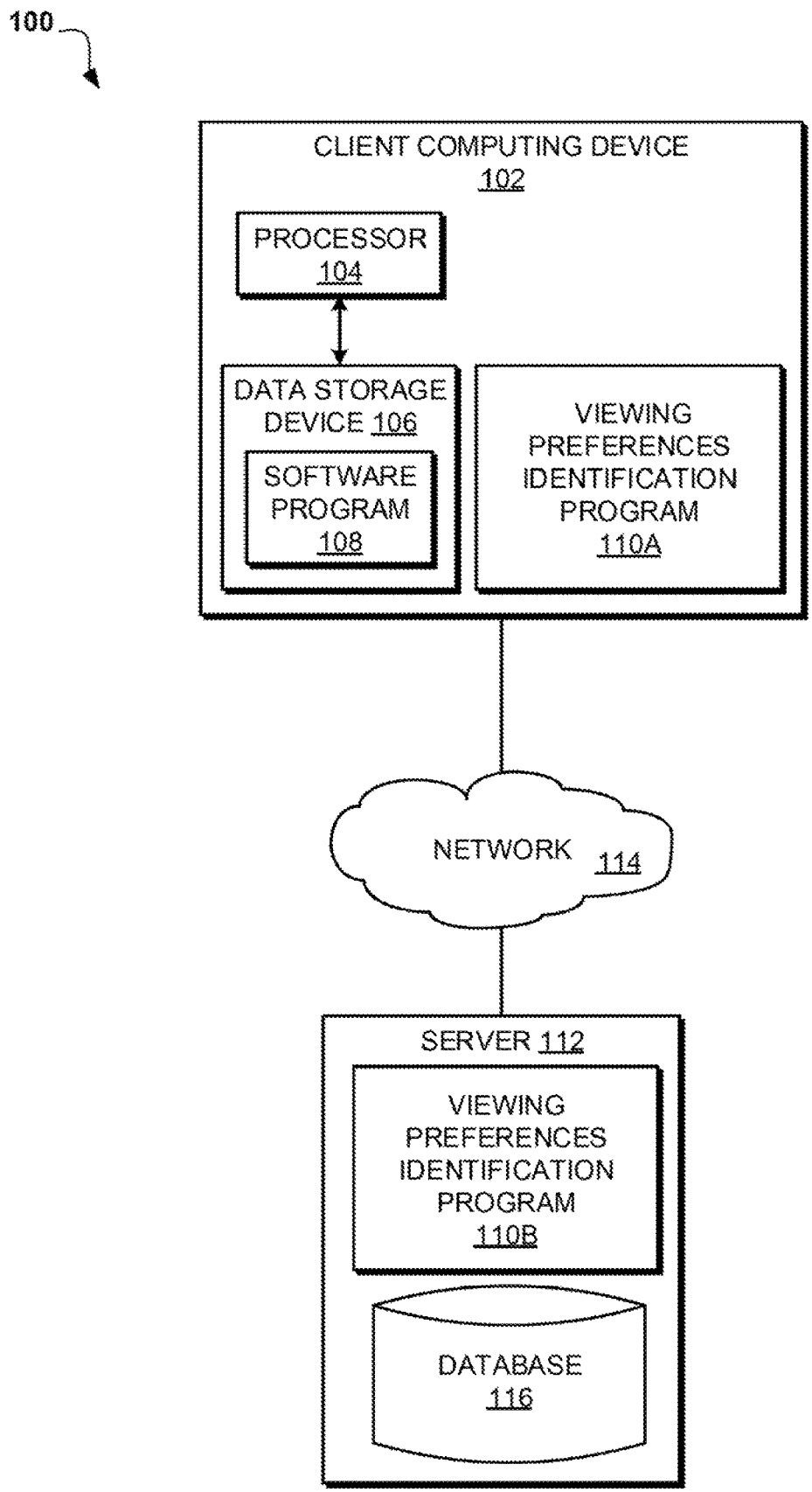
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to streaming technologies. The following described exemplary embodiments provide a system, method, and program product to cognitively determine which user is watching the content of a streaming service and generate recommendations to the given user. Therefore, the present embodiment has the capacity to improve the technical field of streaming technologies by cognitively deriving user viewing preferences of a given user regardless of which profile is logged in to a streaming content service based on determined user identity through an analysis of viewing habits and remote control interaction.

As previously described, streaming is a technology for transferring data to computers and mobile devices over the internet. Streaming media is video or audio content sent in compressed form over the internet and played immediately, rather than being saved to a hard drive. A user does not need to wait to download a file to play streaming media as the media is sent in a continuous stream of data so that it can play as it arrives. There is only an initial, negligible waiting period as the file is buffered. Streaming media is much faster than viewing audio or visual content in the conventional matter, where all the media needs to be downloaded by a viewer completely before viewing it. Typically, users can pause, rewind or fast-forward the file. The other major difference between streaming and downloads is what happens to the data after a user uses it. For downloads, the data is stored on the user device until the user deletes it. For streams, the data is automatically deleted after a user uses it.

Typically, users of streaming services pay little attention to which account they utilize when viewing streaming content. This often may cause incorrect content viewing recommendations for a given user. For example, if a user sits down to watch a movie under a particular user profile and receives recommendations relating to children's movies because a user's daughter may have previously used the user profile to watch a children's movie and, as a result, the user may not get the desired and accurate viewing recommendations that the user may want. This kind of situation may arise often due to the user profile (i.e., parent's profile in the previous scenario) being the first one on the list and typically the profile is shared by everyone in the household. As such, it may be advantageous to, among other things, implement a system capable of cognitively determining which user is watching a show and recommending correct content accordingly based on a user's watching habits, actions, and interactions with streaming systems when the user is viewing the streaming content.

According to one embodiment, a viewing preferences identification program may utilize a cognitive learning approach to determine which user is viewing the content of a streaming service and allow for accurate recommendations to a given user. In at least one other embodiment, the current invention may identify a user through an analysis of viewing habits and remote control interaction. According to another embodiment, the viewing preference identification program may analyze various data to identify users without specifically having to log into a given profile by accessing user internet searches, calendar entries, etc.

The present invention may be a system, a method, and/or a computer program product at any possible technical detail level of integration. The computer program product may include the computer readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for cognitively determining an end consumer of streaming content for the purposes of establishing the user viewing preferences regardless of the user log-in profile.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112 of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a viewing preferences identification program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 9, the client computing device 102 may include internal components 902a and external components 904a, respectively.

The server computer 112 may be a laptop computer, netbook computer, personal computer (PC), a desktop computer, or any programmable electronic device or any network of programmable electronic devices capable of hosting and running a viewing preferences identification program 110B and a database 116 and communicating with the client computing device 102 via the communication network 114, in accordance with embodiments of the invention. As will be discussed with reference to FIG. 9, the server computer 112 may include internal components 902b and external components 904b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the viewing preferences identification program 110A, 110B may be a program capable of refining a user profile by sourcing data from the user's calendar entries, emails and browser searches. The viewing preferences identification program 110A, 110B may also determine patterns within the user's viewing session in a given time frame. The viewing preferences identification program 110A, 110B may further determine patterns based on the user's interaction with a remote control. The viewing preferences identification process is explained in further detail below with respect to FIG. 2.

Figure 2:
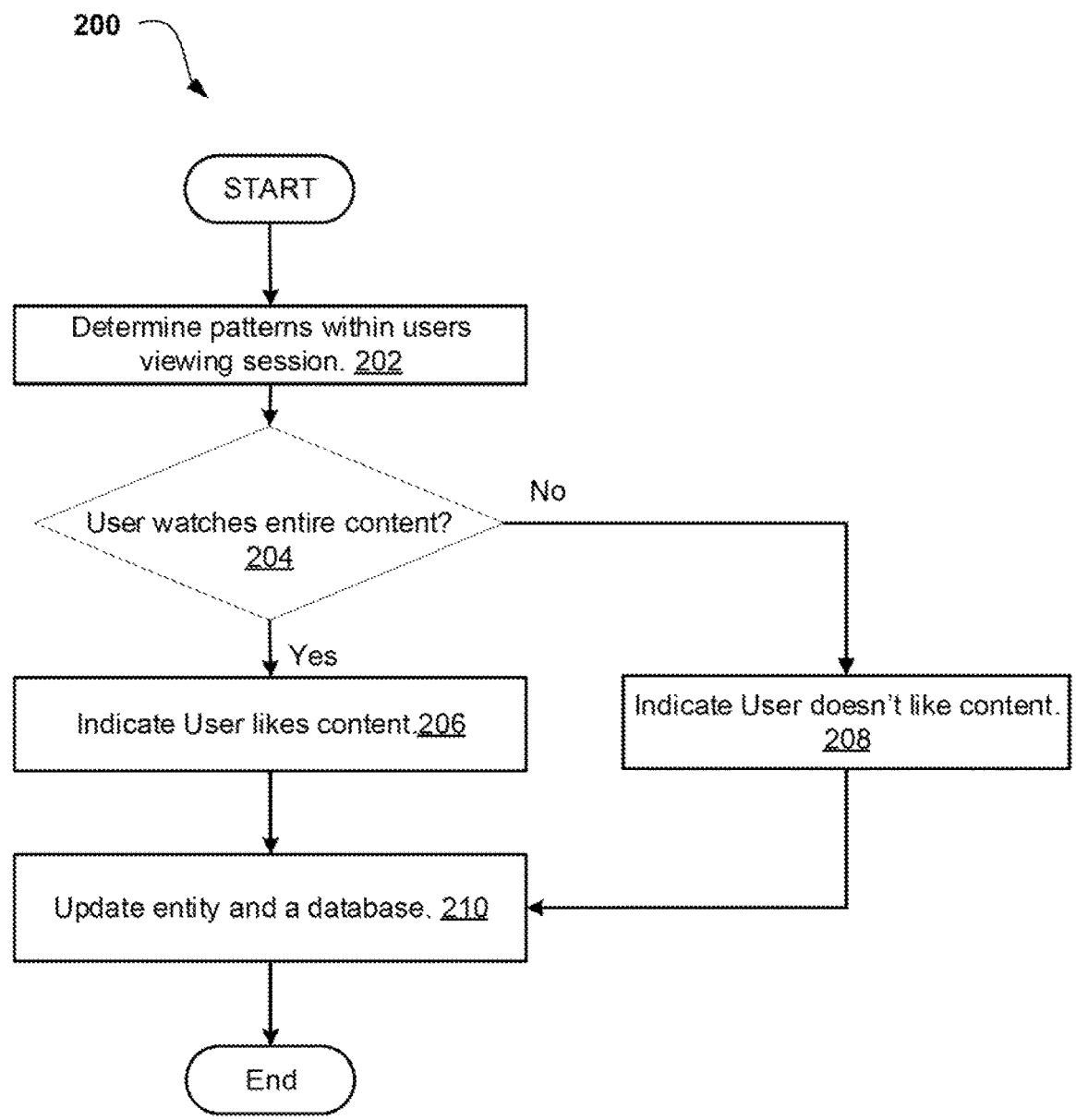
FIG. 2 is an operational flowchart illustrating an individual viewing patterns identification process according to at least one embodiment.

FIG. 2 is an operational flowchart illustrating an individual viewing patterns identification process 200 according to at least one embodiment. At 202, the viewing preferences identification program 110A, 110B determines patterns within a user's viewing session. According to one embodiment, the viewing preferences identification program 110A, 110B may monitor a viewer's behavior when the viewer is watching a show. For example, the viewing preferences identification program 110A, 110B may monitor and determine whether a user starts a show and watches it completely or changes shows several times until the user finds a show that the user watches completely. In other embodiments, the viewing preferences identification program 110A, 110B may monitor and determine whether a viewer acts on suggested recommendations and watches it completely or finds a show independently via individual search. The viewing preferences identification program 110A, 110B may also determine whether a viewer finds a show and watches multiple episodes. The viewing preferences identification program 110A, 110B may also determine whether a viewer is watching a certain genre of show or movie in a certain time period. The viewing preferences identification program 110A, 110B may further interact with a viewer's email systems, e-calendar or internet search engines to determine whether a viewer is watching a certain show the viewer received an email about, a show the viewer mentioned in the viewer's calendar, or a show the viewer searched via the internet. The viewing preferences identification program 110A, 110B may also monitor the movies or shows added to the personal list by a viewer. The viewing preferences identification program 110A, 110B may further monitor and determine whether a viewer is watching a show or movie.

At 204, the viewing preferences identification program 110A, 110B determines whether a viewer watches entire content. According to one embodiment, if the viewing preferences identification program 110A, 110B determines that a viewer watches entire content (step 204, "Yes" branch), the viewing preferences identification program 110A, 110B may indicate the viewer likes the content in step 206. If the viewing preferences identification program 110A, 110B determines that a viewer does not watch the entire content (step 208, "No" branch), the viewing preferences identification program 110A, 110B may indicate the viewer does not like the content in step 208.

At 206, the viewing preferences identification program 110A, 110B indicates the viewer likes the content. According to one embodiment, the viewing preferences identification program 110A, 110B may generate an individual model that represents a given viewer's entity. Items for defining the attributes of an entity may include genres of movies or television shows that the viewer likes or dislikes. The viewing preferences identification program 110A, 110B may update the model based on the determination made in step 204. For example, if a viewer watches a full episode of a given movie or television show, the viewing preferences identification program 110A, 110B may indicate the viewer likes that particular show or movie by updating the attributes of the generated model.

At 208, the viewing preferences identification program 110A, 110B indicates the viewer does not like the content. According to one embodiment, the viewing preferences identification program 110A, 110B may determine that a viewer does not like the content of particular television shows or movies based on the viewer's watching behavior detected in step 204. The viewing preferences identification program 110A, 110B may then update the existing model and the attributes with respect to the viewer's profile and basic information by saving the information as to the shows or movies that the viewer does not watch through the end.

At 210, the viewing preferences identification program 110A, 110B updates the entity and a database. According to one embodiment, the viewing preferences identification program 110A, 110B may update the entity of the pre-generated model and the entity. The data structure may represent attributes indicating the titles of the shows or movies and entities indicating whether a viewer likes or dislikes. In at least one other embodiment, the viewing preferences identification program 110A, 110B may interact with the server 112 and store the information in the database 116.

Figure 3:
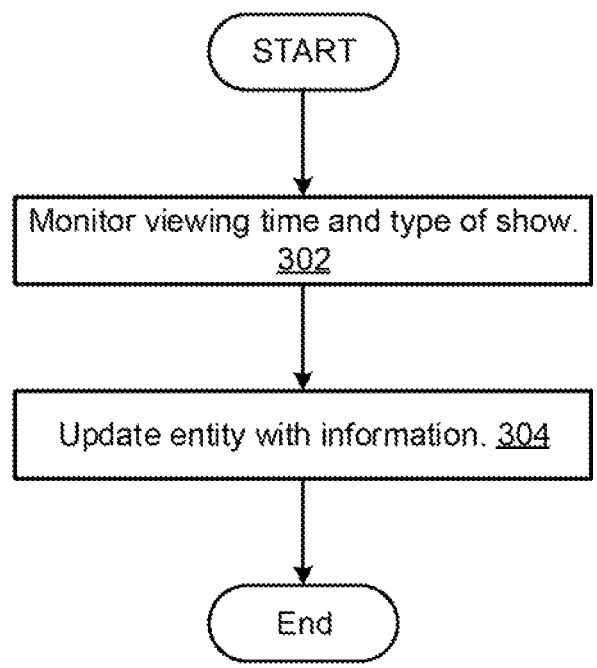
FIG. 3 is an operational flowchart illustrating an entity habit analysis process according to at least one embodiment.

Referring now to FIG. 3, an operational flowchart illustrating an entity habit analysis process is depicted according to at least one embodiment. At 302, the viewing preferences identification program 110A, 110B monitors viewing time and type of shows. According to one embodiment, the viewing preferences identification program 110A, 110B may determine a viewer's viewing patterns based on the viewer's viewing session in a given time frame. For example, if a viewer always watches home improvement shows after 9 P.M. every Monday, Wednesday, and Friday, the viewing preferences identification program 110A, 110B may detect such a pattern and determine the pattern as the viewer's unique viewing pattern. If the viewer always watches action movies every Tuesday using streaming content services, the viewing preferences identification program 110A, 110B may include such a pattern as the viewer specific viewing pattern as well.

At 304, the viewing preferences identification program 110A, 110B updates the entity with the above information. According to one embodiment, the viewing preferences identification program 110A, 110B may generate a model that represents a viewer's viewing habit. The viewing preferences identification program 110A, 110B may generate entities within the model that may represent a viewer's viewing timeframe and a type of a show that the viewer watches in such time frame. The viewing preferences identification program 110A, 110B may interact with the server 112 and store the information in the database 116.

Figure 4:
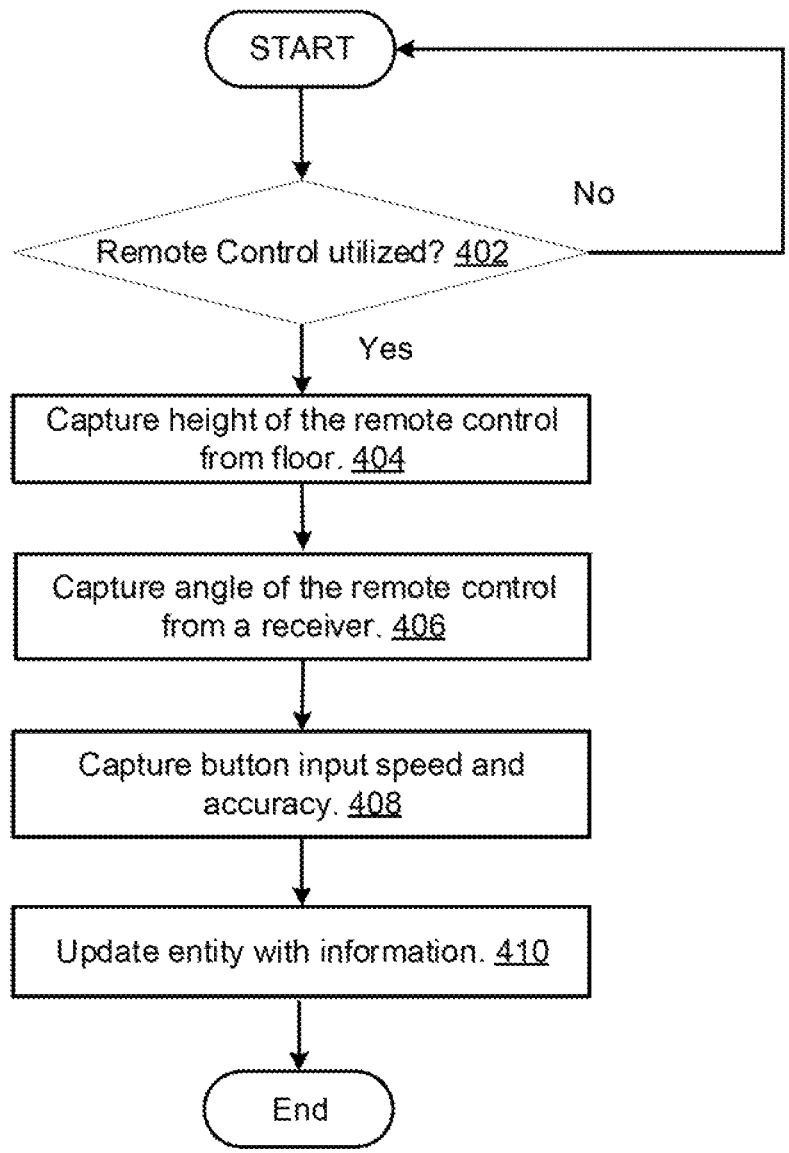
FIG. 4 is an operational flowchart illustrating an entity habit analysis process based on a user interaction with a remote control according to at least one embodiment.

Referring now to FIG. 4, an operational flowchart illustrating an entity habit analysis process with respect to remote control usage is depicted according to at least one embodiment. At 402, the viewing preferences identification program 110A, 110B determines whether a remote control is being utilized. According to one embodiment, the viewing preferences identification program 110A, 110B may determine a viewer's viewing patterns based on the viewer's interaction with remote control. The viewing preferences identification program 110A, 110B may interact with the sensor attached to a remote control to detect whether a viewer is utilizing the remote control to view streaming content. According to one embodiment, if the viewing preferences identification program 110A, 110B determines that a viewer is utilizing a remote control (step 402, "Yes" branch), the viewing preferences identification program 110A, 110B may proceed to step 308 to capture the height of the remote control from the floor. If the viewing preferences identification program 110A, 110B determines that a viewer is not utilizing a remote control (step 402, "No" branch), the viewing preferences identification program 110A, 110B may return to the beginning of the process.

At 404, the viewing preferences identification program 110A, 110B captures the height of the remote control from the floor. According to one embodiment, the viewing preferences identification program 110A, 110B may interact with a sensor attached to the remote control and a receiver to measure the distance between the floor and the remote control when a viewer is utilizing the remote control. For example, if the remote control is positioned or held by a viewer about 2-3 ft above the floor, the viewing preferences identification program 110A, 110B may determine that an adult viewer is watching streaming content. If the remote control is positioned or held by a viewer below the 2-3 ft range, the viewing preferences identification program 110A, 110B may determine that the viewer may be a child of the adult individual.

At 406, the viewing preferences identification program 110A, 110B captures the angle of the remote control from a receiver. According to one embodiment, the viewing preferences identification program 110A, 110B may detect and measure the angle of the remote control from a receiver when held by a viewer. For example, if the angle is measured to be within the pre-configured range of 15-25 degrees, the viewing preferences identification program 110A, 110B may determine that the viewer is an adult individual. If the angle exceeds 25 degrees, the viewing preferences identification program 110A, 110B may determine that the viewer's height is shorter than an average adult and determine that the viewer may be a child.

At 408, the viewing preferences identification program 110A, 110B captures button input speed and accuracy. According to one embodiment, the viewing preferences identification program 110A, 110B may monitor a viewer's button input when the viewer is trying to search for a television show or a movie using the remote control. The viewing preferences identification program 110A, 110B may also monitor the accuracy of such input. For example, if a viewer searches home improvement shows every other day, the viewing preferences identification program 110A, 110B may determine that the viewer is an adult individual who regularly watches home improvement shows on weekdays. However, if a viewer enters a title related to a kid's television show with relatively less accuracy compared to the accuracy when the adult individual enters "home improvement show", the viewing preferences identification program 110A, 110B may determine that a child of the adult individual is using the remote control now.

At 410, the viewing preferences identification program 110A, 110B may update an entity with such information. According to one embodiment, the viewing preferences identification program 110A, 110B may interact with the server 112 and store the determined information in the database 116. In at least one other embodiment, the viewing preferences identification program 110A, 110B may update the entity of the pre-generated model with the average distance, angle, button input and its accuracy within a particular viewer's profile.

Figure 5:
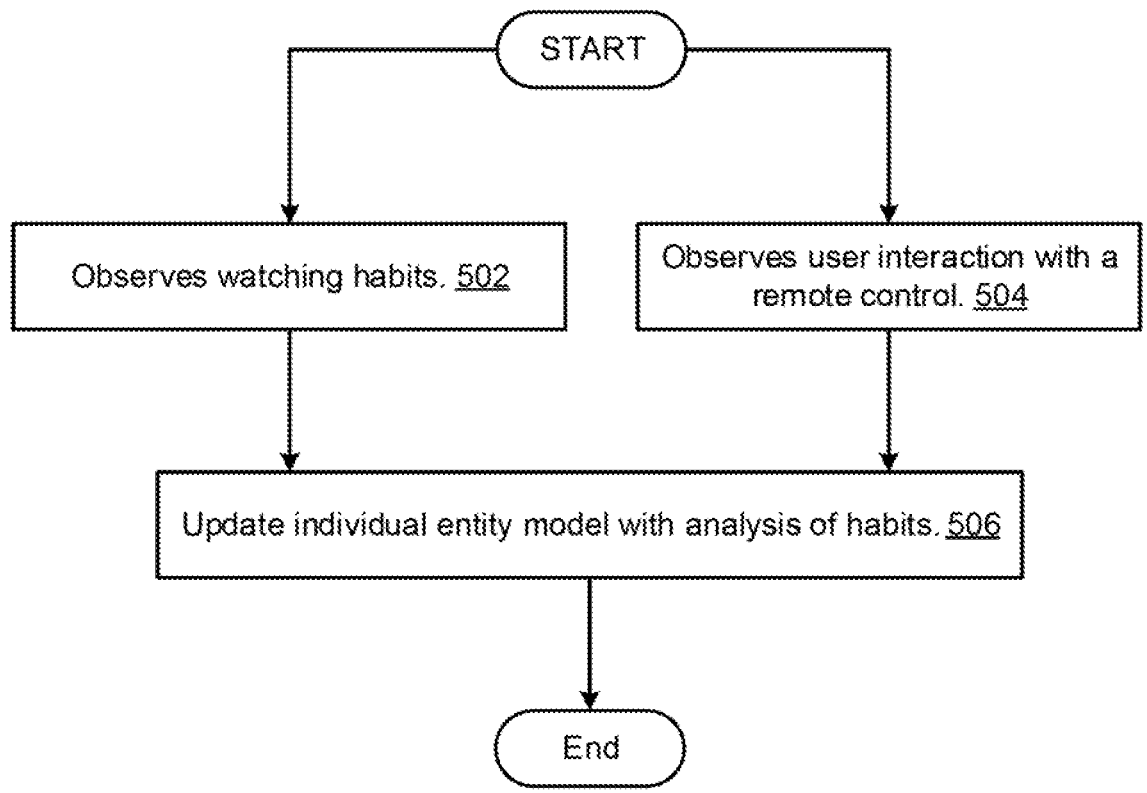
FIG. 5 is an operational flowchart illustrating a combination of processes illustrated in FIG. 3 and FIG. 4.

Referring now to FIG. 5, an operational flowchart illustrating a combination of processes illustrated in FIG. 3 and FIG. 4 is depicted according to at least one embodiment. At 502, the viewing preferences identification program 110A, 110B observes a viewer's watching habits. According to one embodiment, the viewing preferences identification program 110A, 110B may retrieve the information collected in step 302. The viewing preferences identification program 110A, 110B may observe and determine a unique pattern of the viewer's watching habit as to days, time frame and the type of shows the viewer watches.

At 504, the viewing preferences identification program 110A, 110B observes a viewer interaction with remote control. As described in step 402-410, the viewing preferences identification program 110A, 110B may detect and determine who is viewing particular streaming content based on the captured distance, angle, and accuracy of the search input speed.

At 506, the viewing preferences identification program 110A, 110B updates the individual entity model with an analysis of the viewer's habits determined in step 502 and step 504. According to one embodiment, the viewing preferences identification program 110A, 110B may integrate the information obtained in step 502 with the information obtained in step 504. For example, the viewing preferences identification program 110A, 110B may determine an angle and distance of the remote control from a receiver when an adult viewer is watching a home improvement show on particular days (e.g., every Wednesday and Friday) and update the model and save the date in the database 116.

Figure 6:
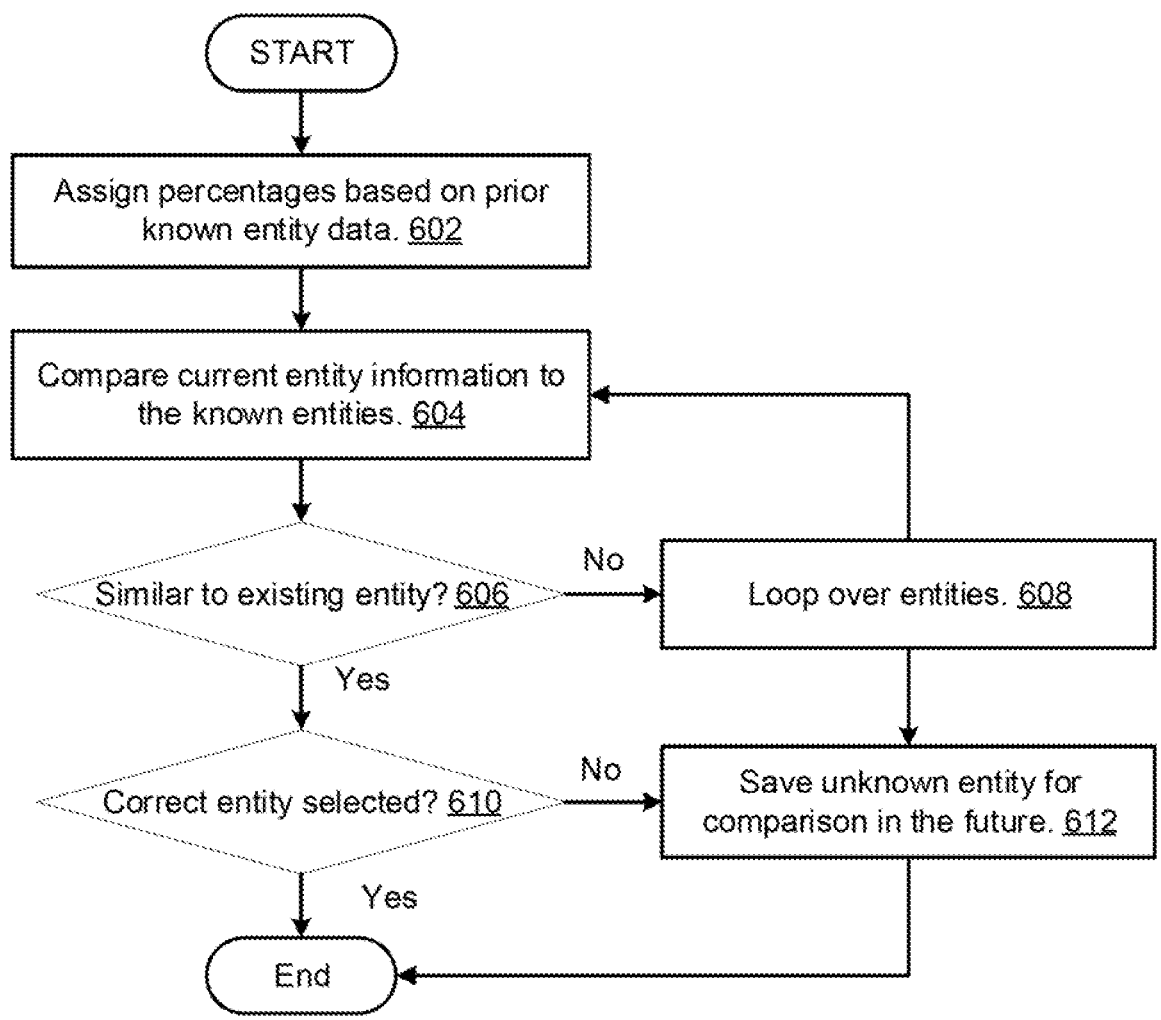
FIG. 6 is an operational flowchart illustrating an entity comparison process according to at least one embodiment.

Referring now to FIG. 6, an operational flowchart illustrating an entity comparison process is depicted according to at least one embodiment. At 602, the viewing preferences identification program 110A, 110B assigns percentages based on prior known entity data. According to one embodiment, the viewing preferences identification program 110A, 110B may compare viewing habits, time habits, and remote habits to assign a viewer confidence index level for each match to the categories by providing a score by which a viewer is matched to each habit. The viewing preferences identification program 110A, 110B may generate a table, such as Table 1 below, representing an exemplary viewing confidence index level across known entities.

TABLE 1

| Type of Analysis | Viewing Confidence Index Level | | | |
| --- | --- | --- | --- | --- |
| | User | | | |
| | A | B | C | D |
| Viewing habits | 5 | 4 | −1 | −1 |
| Time habits | 8 | −1 | 5 | 1 |
| Remote interaction | 10 | 3 | 6 | 8 |
| Viewer Confidence Index | 23 | 6 | 10 | 8 |

In the above example, User A is assigned the highest scores for the attributes such as viewing habits, time habits, and remote interaction. The last row represents a total of the scores assigned for each attribute. User A is given the score of 23 and the viewing preferences identification program 110A, 110B may determine that User A is the viewer that is currently viewing particular streaming content.

At 604, the viewing preferences identification program 110A, 110B compares current entity information to the known entities. According to one embodiment, the viewing preferences identification program 110A, 110B may compare the current entity information to known entities stored in the database 116. For example, the viewing preferences identification program 110A, 110B may search an individual name with similar viewer confidence index score. In the above example, the viewing preferences identification program 110A, 110B may look to an individual's attributes whose viewer confidence index score is equal to or about a score of 23. In at least one other embodiment, the viewing preferences identification program 110A, 110B may look into individual scores assigned to each attribute. For example, the viewing preferences identification program 110A, 110B may find an individual assigned a viewing habits score of 5 and a time habits score of 8 such that the system may distinguish multiple individuals with similar total viewer confidence index score.

At 606, the viewing preferences identification program 110A, 110B determines whether the similar entity exists. According to one embodiment, if the viewing preferences identification program 110A, 110B determines that the similar entity exists (step 606, "Yes" branch), the viewing preferences identification program 110A, 110B may proceed to step 410 to determine whether the correct entity is selected. If the viewing preferences identification program 110A, 110B determines that the similar entity does not exist (step 606, "No" branch), the viewing preferences identification program 110A, 110B proceeds to step 608 to search other entities.

At 608, the viewing preferences identification program 110A, 110B loops over entities. According to one embodiment, the viewing preferences identification program 110A, 110B may continue to compare the current entity information to the other entities stored in the database 116. In at least one other embodiment, the viewing preferences identification program 110A, 110B may save the current entity information even if any similar existing entity is found in the database 116.

At 610, the viewing preferences identification program 110A, 110B determines whether the correct entity is selected. According to one embodiment, a prompt may be displayed via a graphical user interface to user ABC when there is a close match between an existing entity and the current entity. If the viewer selects "Yes" and confirms that the viewer is user ABC, then the viewing preferences identification program 110A, 110B may determine that the correct entity is selected. If the viewing preferences identification program 110A, 110B determines that the correct entity is selected (step 610, "Yes" branch), the viewing preferences identification program 110A, 110B may proceed to the end of the process. If the viewing preferences identification program 110A, 110B determines that the incorrect entity is selected (step 610, "No" branch), the viewing preferences identification program 110A, 110B may proceed to step 612 to save the unknown entity for comparison in the future.

At 612, the viewing preferences identification program 110A, 110B saves unknown entities for comparison in the future. According to one embodiment, the viewing preferences identification program 110A, 110B may save information about the current entity if there is no similar existing entity or correct entity is not selected. The viewing preferences identification program 110A, 110B may also indicate that when the search was processed and the result of the process (i.e., no match is found) in the database 116. The viewing preferences identification program 110A, 110B may treat the current entity with no matching entity as an existing entity in the next comparison.

Figure 7:
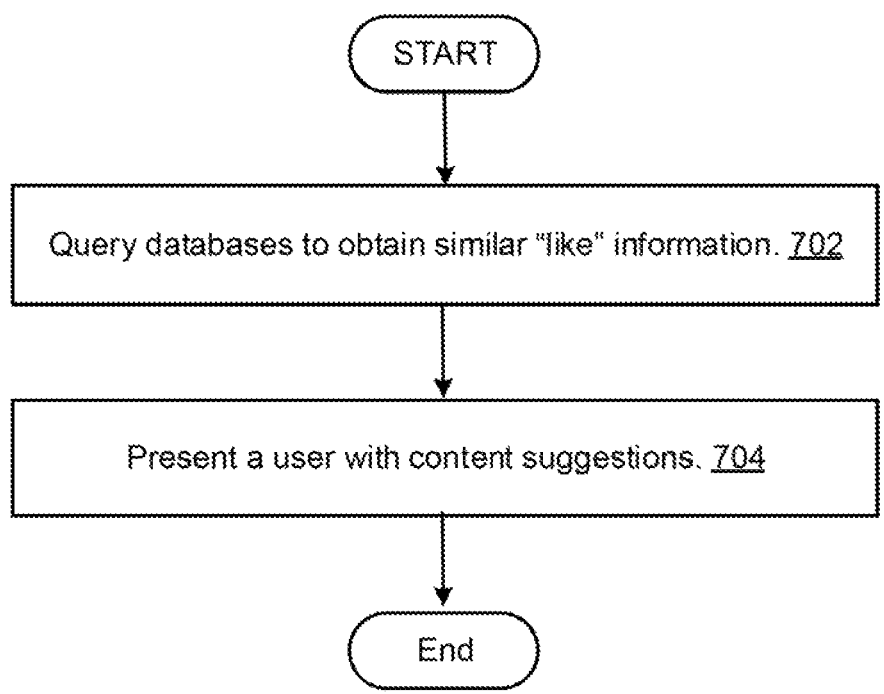
FIG. 7 is an operational flowchart illustrating an entity suggestion process according to at least one embodiment.

Referring now to FIG. 7, an operational flowchart illustrating an entity suggestion process is depicted according to at least one embodiment. At 702, the viewing preferences identification program 110A, 110B queries databases to obtain similar "like" information. According to one embodiment, the viewing preferences identification program 110A, 110B may interact with the database 116 to search for streaming content information similar to one that the viewing preferences identification program 110A, 110B has previously determined and indicated as the content a viewer likes. For example, if the viewing preferences identification program 110A, 110B previously determined that a viewer likes to watch a home improvement show, the viewing preferences identification program 110A, 110B may then search for the information related to similar topics, such as gardening, do-it-yourself construction tools, and home furniture. In at least one other embodiment, the viewing preferences identification program 110A, 110B may query other databases or existing internet websites to find similar streaming content information that a viewer may be interested in.

At 704, the viewing preferences identification program 110A, 110B presents a viewer with content suggestions. According to one embodiment, the viewing preferences identification program 110A, 110B may provide a viewer with a list of suggested streaming content based on the streaming content information that a viewer likes to watch. For example, if the viewing preferences identification program 110A, 110B determines that a viewer may be interested in gardening shows based on the stored information that the viewer likes to watch home improvement shows, the viewing preferences identification program 110A, 110B may find a list of gardening shows and prompt the list to the viewer via a graphical interface. The viewer may then select a show from the list and the viewing preferences identification program 110A, 110B may store such information as new streaming content that the viewer likes to watch in the database 116. In at least one other embodiment, the viewing preferences identification program 110A, 110B may receive feedback from a viewer regarding the list and narrow the list based on such feedback. The viewing preferences identification program 110A, 110B may then present a more specific list of shows with fewer options to the viewer.

Figure 8:
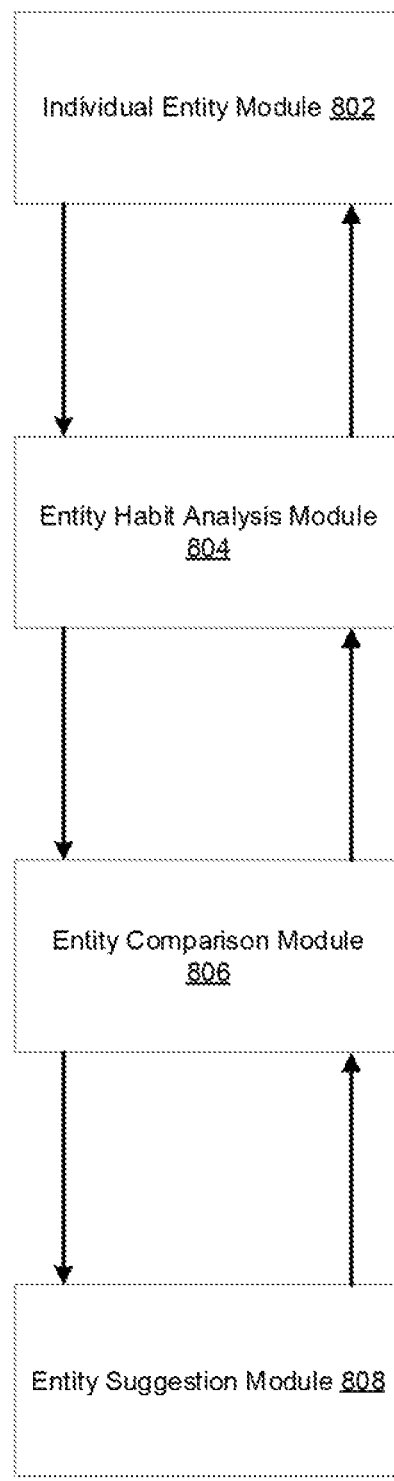
FIG. 8 is a block diagram showing a viewing preferences identification platform according to at least one embodiment.

Referring now to FIG. 8, a block diagram showing a viewing preferences identification platform is depicted according to at least one embodiment. According to one embodiment, the viewing preferences identification program 110A, 110B may include components such as an individual entity module 802, an entity habit analysis module 804, an entity comparison module 806 and an entity suggestion module 808. In the individual entity module 802, a user may create an individual entity defining the user, the user interests, likes, and how the user may interact with a remote control for streaming devices or the system based on the data related to the user habits. Additional attributes may be specified by the user to further refine the entity and the viewing preferences identification program 110A, 110B may source data from the user's calendar entries, email, browser searches, social media sites and etc. The viewing preferences identification program 110A, 110B may generate a model based on the above attributes to represent a given user's entity. Information gathered for defining the attributes of an entity may include, entity name, age, genres of movies or shows that the user likes or dislikes, actors the user may like, user interests or hobbies, calendar entries, email entries, social media network participation, historical viewing information from previous sessions and habits regarding the user usage of remote control.

The entity habit analysis module 804 may perform an analysis of a user's watching habits and actions during a viewing session. The viewing preferences identification program 110A, 110B may monitor the time frame in which a user watches a show or movie. the viewing preferences identification program 110A, 110B may also determine the user's habits regarding the user's interaction with remote control. For example, the viewing preferences identification program 110A, 110B may monitor whether the user does not misspell a title or enters input too quickly or slowly. The viewing preferences identification program 110A, 110B may further determine the angle at which the device is held in relation to a receiver and how high the remote control is held when issuing commands.

The entity comparison module 806 may take the output from the individual entity module 802 and compare it against the output of the entity habit analysis module 804. If the watcher and the entity have a close match, then the viewing preferences identification program 110A, 110B may prompt if the user is watching. the viewing preferences identification program 110A, 110B may then utilize this answer to confirm or deny the user is the correct user. This information may be stored within the entity and learned over time to predict the correct user in the future. Remote usage and habit criteria may continue to build and the viewing preferences identification program 110A, 110B may continue to learn from different users to determine their unique footprint or patterns within particular streaming services. The entity comparison module 806 may further assign a viewer confidence index level for each match to the categories by giving a score.

The entity comparison module 808 may utilize existing internet-based sites to find a similar movie or show titles based on an entity "likes" and offer such streaming content as viewing suggestions if they exist from the streaming content provider. The viewing preferences identification program 110A, 110B may also perform more concrete action by narrowing the suggestions and provide a user with fewer options or receive feedback regarding the initial suggestions and modify the initial suggestions.

It may be appreciated that FIGS. 2-8 provide only an illustration of one implementation and do not imply any limitations with regard to how different embodiments may be implemented. Many modifications to the depicted environments may be made based on design and implementation requirements. For example, in at least one embodiment, the viewing preferences identification program 110A, 110B may utilize the built-in camera for facial recognition or sound sensors to analyze background noises so that the viewing preferences identification program 110A, 110B may further refine a user and the user habits and patterns.

Figure 9:
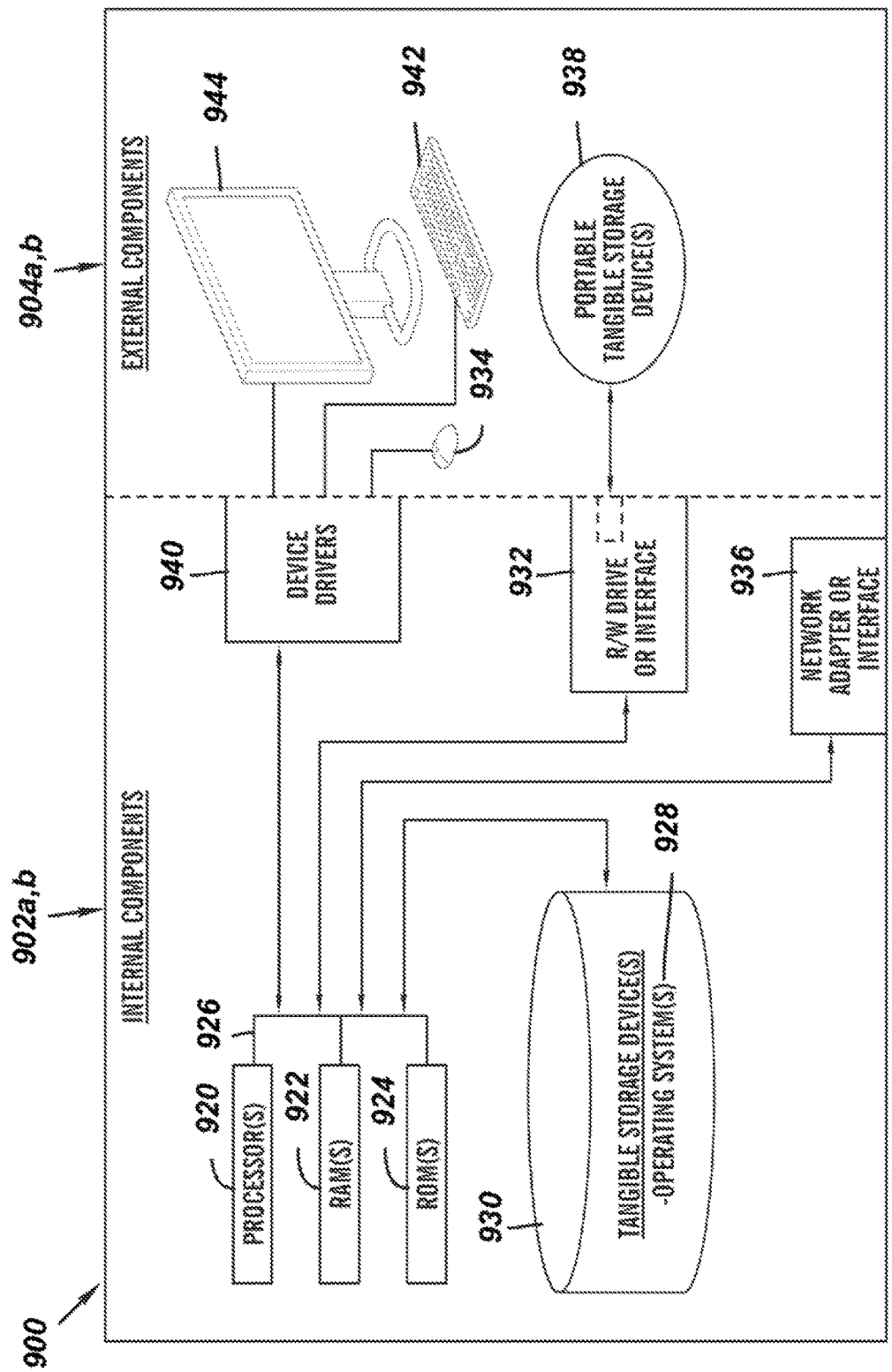
FIG. 9 is a block diagram of internal and external components of computers and servers depicted in FIG. 1 according to at least one embodiment.

FIG. 9 is a block diagram 900 of internal and external components of the client computing device 102 and the server 112 depicted in FIG. 1 in accordance with an embodiment of the present invention. It should be appreciated that FIG. 9 provides only an illustration of one implementation and does not imply any limitations with regard to the environments in which different embodiments may be implemented. Many modifications to the depicted environments may be made based on design and implementation requirements.

The data processing system 902, 904 is representative of any electronic device capable of executing machine-readable program instructions. The data processing system 902, 904 may be representative of a smartphone, a computer system, PDA, or other electronic devices. Examples of computing systems, environments, and/or configurations that may be represented by the data processing system 902, 904 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 902 a,b and external components 904 a,b illustrated in FIG. 9. Each of the sets of internal components 902 include one or more processors 920, one or more computer-readable RAMs 922, and one or more computer-readable ROMs 924 on one or more buses 926, and one or more operating systems 928 and one or more computer-readable tangible storage devices 930. The one or more operating systems 928, the software program 908 and the viewing preferences identification program 110A in the client computing device 102 and the viewing preferences identification program 110B in the server 112 are stored on one or more of the respective computer-readable tangible storage devices 930 for execution by one or more of the respective processors 920 via one or more of the respective RAMs 922 (which typically include cache memory). In the embodiment illustrated in FIG. 9, each of the computer-readable tangible storage devices 930 is a magnetic disk storage device of an internal hard drive. Alternatively, each of the computer-readable tangible storage devices 930 is a semiconductor storage device such as ROM 924, EPROM, flash memory or any other computer-readable tangible storage device that can store a computer program and digital information.

Each set of internal components 902 a,b also includes an R/W drive or interface 932 to read from and write to one or more portable computer-readable tangible storage devices 938 such as a CD-ROM, DVD, memory stick, magnetic tape, magnetic disk, optical disk or semiconductor storage device. A software program, such as the viewing preferences identification program 110A, 110B can be stored on one or more of the respective portable computer-readable tangible storage devices 938, read via the respective R/W drive or interface 932 and loaded into the respective hard drive 930.

Each set of internal components 902 a,b also includes network adapters or interfaces 936 such as a TCP/IP adapter cards, wireless Wi-Fi interface cards, or 3G or 4G wireless interface cards or other wired or wireless communication links. The software program 108 and the viewing preferences identification program 110A in the client computing device 102 and the viewing preferences identification program 110B in the server 112 can be downloaded to the client computing device 102 and the server 112 from an external computer via a network (for example, the Internet, a local area network or other, wide area network) and respective network adapters or interfaces 936. From the network adapters or interfaces 936, the software program 108 and the viewing preferences identification program 110A in the client computing device 102 and the viewing preferences identification program 110B in the server 112 are loaded into the respective hard drive 930. The network may comprise copper wires, optical fibers, wireless transmission, routers, firewalls, switches, gateway computers and/or edge servers.

Each of the sets of external components 904 a,b can include a computer display monitor 944, a keyboard 942, and a computer mouse 934. External components 904 a,b can also include touch screens, virtual keyboards, touch pads, pointing devices, and other human interface devices. Each of the sets of internal components 902 a,b also includes device drivers 940 to interface to computer display monitor 944, keyboard 942, and computer mouse 934. The device drivers 940, R/W drive or interface 932, and network adapter or interface 936 comprise hardware and software (stored in storage device 930 and/or ROM 924).

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 10:
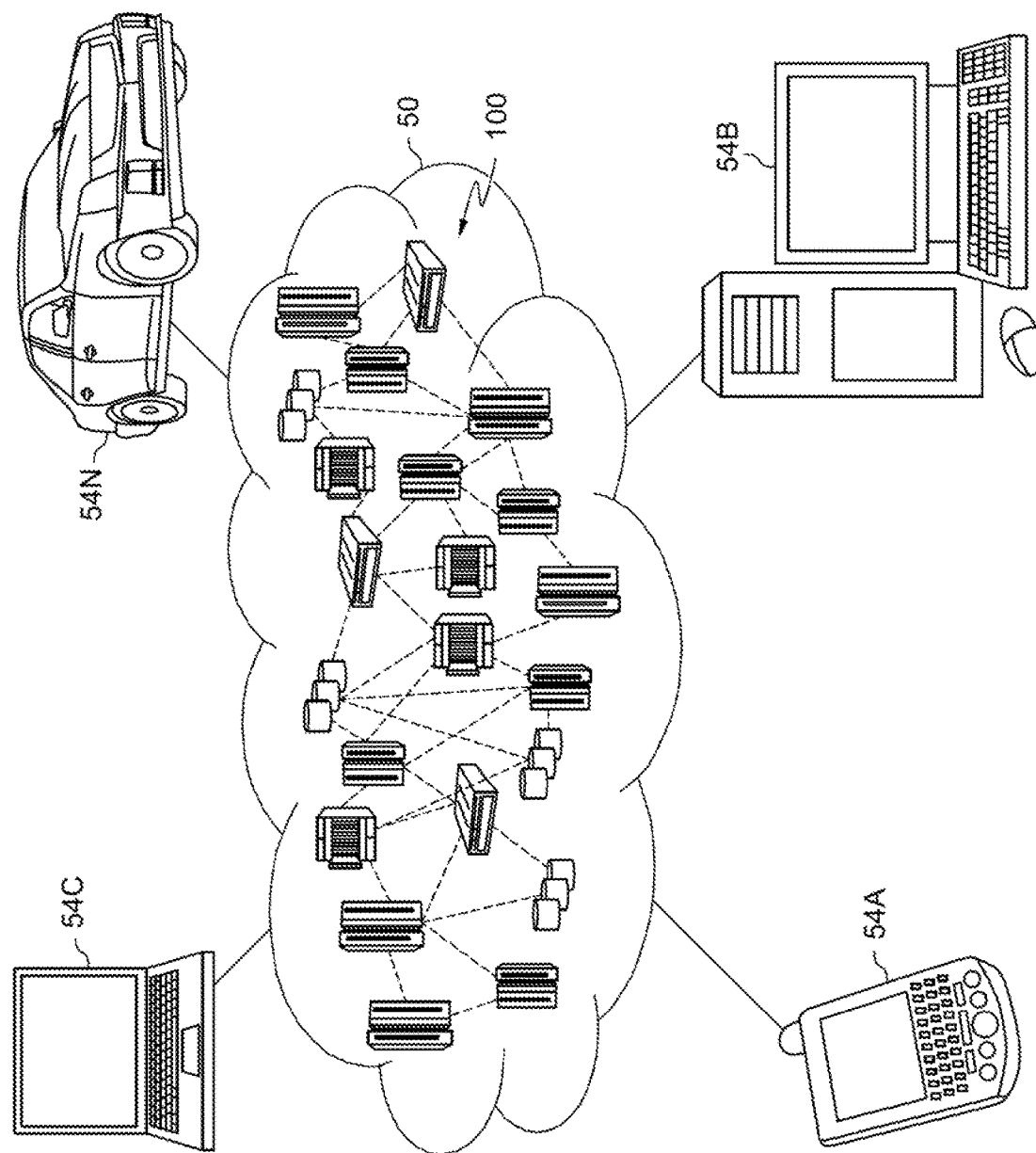
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 100 and cloud computing environment 50 can communicate with any type of computerized device over any type of network and/or network addressable connection (e.g., using a web browser).

Figure 11:
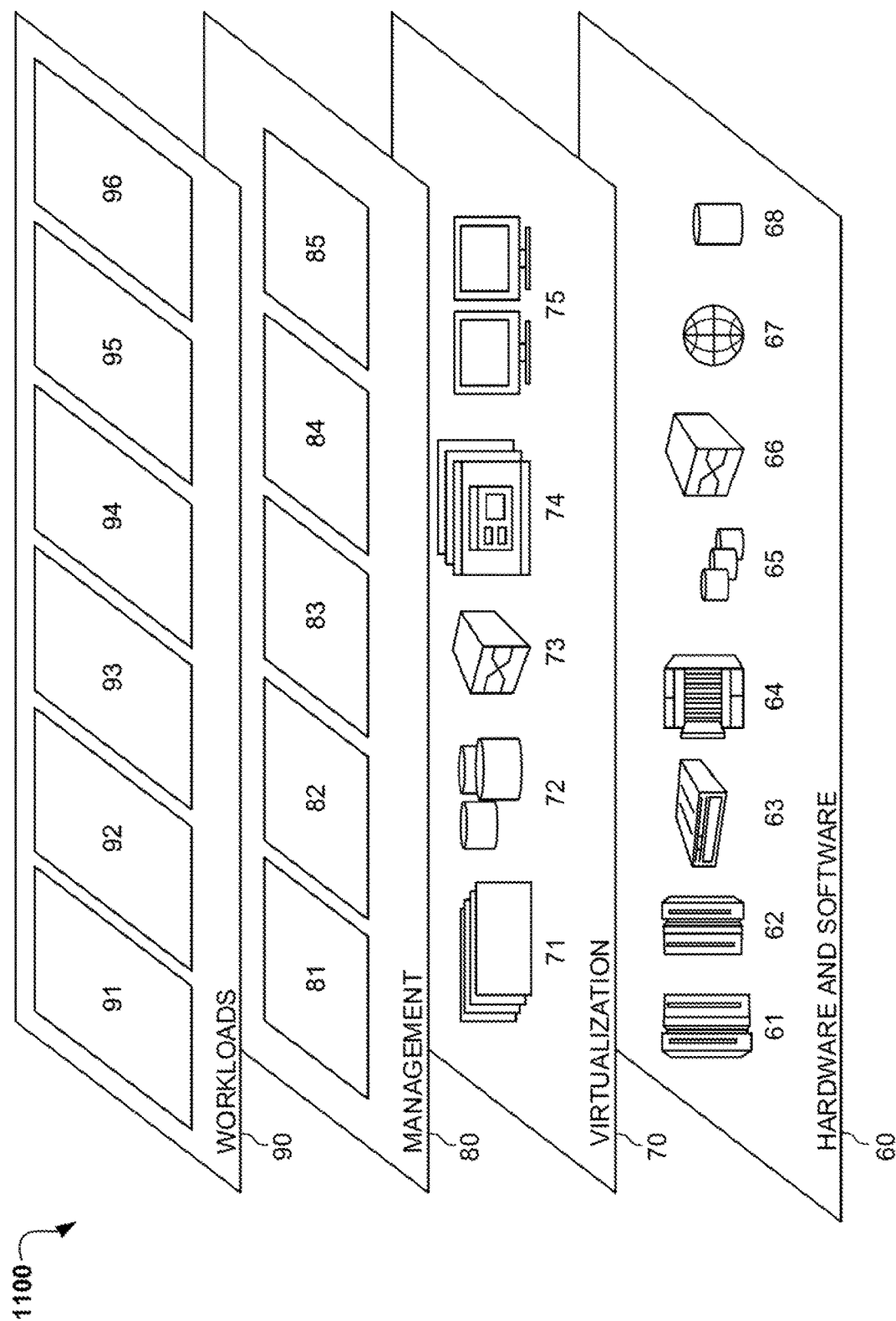
FIG. 11 depicts abstraction model layers according to an embodiment of the present invention.

Referring now to FIG. 11, a set of functional abstraction layers 1100 provided by cloud computing environment 50 is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and viewing preferences identification 96. Viewing preferences identification 96 may relate to deriving a user identity of a streaming content service regardless of which profile is logged in through analysis of viewing habits and remote control interaction.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for viewing preferences identification, the method comprising:
   receiving, by a processor, a plurality of data related to a user profile;
   collecting user interaction information from a streaming content service;
   analyzing user habits and patterns based on the collected user interaction information;

analyzing user interaction with a remote control when watching a show or movie through the streaming content service, wherein the user habits and the patterns comprise a viewing habit, a time habit and a remote control interaction habit, wherein the remote control interaction habit is determined by capturing information that comprises a height of the remote control from a floor, an angle of the remote control from a receiver and button input speed and a button input accuracy, wherein the captured information is stored in a database;

determining a viewing confidence index for a user based on a score assigned to the viewing habit, the time habit and the remote control interaction habit;

comparing the user habits and patterns with the received user profile based on the determined viewing confidence index; and prompting the user to confirm an identity associated with the user profile when there is a match between the user profile and the habits and patterns based on the viewing confidence index.

2. The method of claim 1, further comprising:
monitoring whether the user watches streaming content in its entirety; and
in response to the user watching the streaming content in its entirety, storing the information in a database as content that the user likes.

3. The method of claim 1, further comprising:
monitoring whether the user watches streaming content in its entirety; and
in response to the user watching the streaming content only partially, storing the information in a database as content that the user dislikes.

4. The method of claim 1, wherein the user habits and patterns based on the user interaction information are derived from a viewing time and a type of programming that the user watches.

5. The method of claim 1, further comprising:
querying databases to obtain other programming information similar to content that the user likes; and
prompting the user with similar content suggestions.

6. The method of claim 1, further comprising:
refining the user profile, habits and patterns by utilizing a built-in camera for facial recognition or sound sensors to analyze background noises.

7. A computer system for viewing preferences identification, the computer system comprising:
one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:

receiving, by a processor, a plurality of data related to a user profile;

collecting user interaction information from a streaming content service;

analyzing user habits and patterns based on the collected user interaction information;

analyzing user interaction with a remote control when watching a show or movie through the streaming content service, wherein the user habits and the patterns comprise a viewing habit, a time habit and a remote control interaction habit, wherein the remote control interaction habit is determined by capturing information that comprises a height of the remote control from a floor, an angle of the remote control from a receiver and button input speed and a button input accuracy, wherein the captured information is stored in a database;

determining a viewing confidence index for a user based on a score assigned to the viewing habit, the time habit and the remote control interaction habit;

comparing the user habits and patterns with the received user profile based on the determined viewing confidence index; and prompting the user to confirm an identity associated with the user profile when there is a match between the user profile and the habits and patterns based on the viewing confidence index.

8. The computer system of claim 7, further comprising:
monitoring whether the user watches streaming content in its entirety; and
in response to the user watching the streaming content in its entirety, storing the information in a database as content that the user likes.

9. The computer system of claim 7, further comprising:
monitoring whether the user watches streaming content in its entirety; and
in response to the user watching the streaming content only partially, storing the information in a database as content that the user dislikes.

10. The computer system of claim 7, wherein the user habits and patterns based on the user interaction information are derived from a viewing time and a type of programming that the user watches.

11. The computer system of claim 7, further comprising:
querying databases to obtain other programming information similar to content that the user likes; and
prompting the user with similar content suggestions.

12. The computer system of claim 7, further comprising:
refining the user profile, habits and patterns by utilizing a built-in camera for facial recognition or sound sensors to analyze background noises.

13. A computer program product for viewing preferences identification, the computer program product comprising:
one or more non-transitory computer-readable tangible storage media and program instructions stored on at least one of the one or more tangible storage media, the program instructions executable by a processor of a computer to perform a method, the method comprising:

receiving, by a processor, a plurality of data related to a user profile;

collecting user interaction information from a streaming content service;

analyzing user habits and patterns based on the collected user interaction information;

analyzing user interaction with a remote control when watching a show or movie through the streaming content service, wherein the user habits and the patterns comprise a viewing habit, a time habit and a remote control interaction habit, wherein the remote control interaction habit is determined by capturing information that comprises a height of the remote control from a floor, an angle of the remote control from a receiver and button input speed and a button input accuracy, wherein the captured information is stored in a database;

determining a viewing confidence index for a user based on a score assigned to the viewing habit, the time habit and the remote control interaction habit;

comparing the user habits and patterns with the received user profile based on the determined viewing confidence index; and prompting the user to confirm an identity associated with the user profile when there is a match between the user profile and the habits and patterns based on the viewing confidence index.

14. The computer program product of claim 13, further comprising:

monitoring whether the user watches streaming content in its entirety; and in response to the user watching the streaming content in its entirety, storing the information in a database as content that the user likes.

15. The computer program product of claim 13, further comprising:

monitoring whether the user watches streaming content in its entirety; and in response to the user watching the streaming content only partially, storing the information in a database as content that the user dislikes.

16. The computer program product of claim 13, wherein the user habits and patterns based on the user interaction information are derived from a viewing time and a type of programming that the user watches.

17. The computer program product of claim 13, further comprising:

querying databases to obtain other programming information similar to content that the user likes; and prompting the user with similar content suggestions.

18. The computer program product of claim 13, further comprising:

refining the user profile, habits and patterns by utilizing a built-in camera for facial recognition or sound sensors to analyze background noises.

* * * * *